United States Patent [19]

Baker et al.

[11] 4,000,003
[45] Dec. 28, 1976

[54] FUEL CELL-SECONDARY CELL COMBINATION

[75] Inventors: Bernard S. Baker, Brookfield Center, Conn.; Ralph N. Camp, Waltham, Mass.

[73] Assignee: The United States of America as represented by the Secretary of the Army, Washington, D.C.

[22] Filed: Jan. 2, 1976

[21] Appl. No.: 646,214

[52] U.S. Cl. .................................. 429/7; 429/9; 429/12
[51] Int. Cl.² ................................ H01M 16/00
[58] Field of Search ............ 136/86 R, 86 C, 86 E

[56] References Cited
UNITED STATES PATENTS

| | | | |
|---|---|---|---|
| 3,338,746 | 8/1967 | Plust et al. | 136/86 C |
| 3,410,729 | 11/1968 | Manion | 136/86 E |
| 3,649,360 | 3/1972 | Bloomfield et al. | 136/86 C |

*Primary Examiner*—John H. Mack
*Assistant Examiner*—H. A. Feeley
*Attorney, Agent, or Firm*—Nathan Edelberg; Sheldon Kanars; Roy E. Gordon

[57] ABSTRACT

A hybrid fuel cell secondary battery system suitable for low power sensor applications is provided. The system comprises in combination, a fuel cell, a fully contained fuel and oxidant source for the fuel cell, a DC to DC power processor for boosting the voltage output from the fuel cell, and a nickel-cadmium battery in parallel with the output from the DC to DC processor to sustain peak power drains.

9 Claims, 2 Drawing Figures

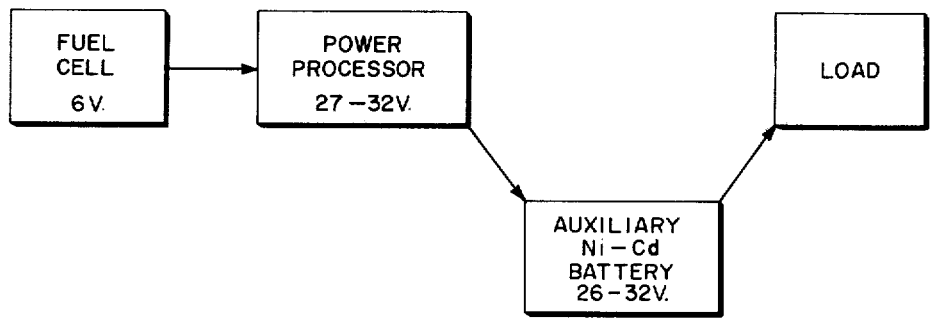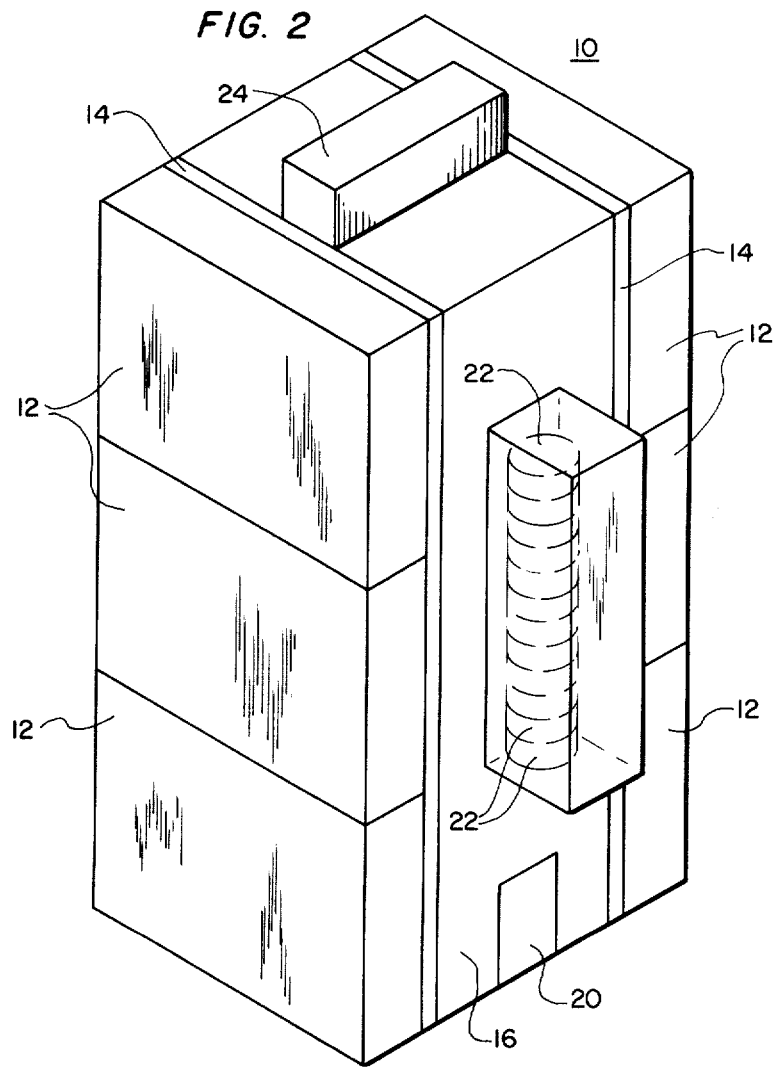

FUEL CELL-SECONDARY CELL COMBINATION

The invention described herein was made under a contract with the Government.

BACKGROUND OF THE INVENTION

This invention relates in general, to hybrid fuel cell secondary battery systems, and in particular, to such a system wherein the fuel and oxidant sources for the fuel cell are fully contained within the cell.

Heretofore, hybrid fuel cell systems have operated in the 60 watt to 240 watt range and have been further characterized by relatively heavy battery weights of about 30 to 32 pounds and by relatively large battery volumes. Such large battery weights and volumes are inefficient where one is interested in a low power supply source of a few milliwatts as for example, in a sensor having a large steady state to peak current requirement.

SUMMARY OF THE INVENTION

The general object of this invention is to provide a hybrid fuel cell secondary battery system suitable for low power sensor applications. A more particular object of this invention is to provide such a system in which the operating life of the fuel cell will be quite long.

The hybrid fuel cell secondary battery system of this invention comprises in combination, a fuel cell, a fully contained fuel and oxidant source for the fuel cell, a DC to DC power processor for boosting the voltage output from the fuel cell and a secondary battery such as a nickel-cadmium battery in parallel with the output from the DC to DC processor to sustain peak power drains.

To operate the fuel cell, hydrogen is a preferred fuel since it permits operation at high voltages and/or current densities. Hydrogen, being a gas, is difficult to store efficiently. To minimize volume it can be stored at high pressures. Such storage, however, results in a high weight, high cost pressure vessel. Storage as a liquid requires elaborate refrigeration equipment not suitable for small power systems. In the system of this invention, the hydrogen is stored within the fuel cell as a chemical in the form of calcium hydride ($CaH_2$). Storing hydrogen in this manner is both compact and lightweight but requires some mechanism for the release of the hydrogen. In this instance, the release mechanism is the reaction between calcium hydride and water according to the reaction:

$$CaH_2 + 2H_2O \rightarrow 2H_2 + Ca(OH)_2 \qquad (1)$$

Examining reaction (1) for every mole of $CaH_2$ consumed, two moles of water are required and two moles of hydrogen are produced.

Fortunately, in the fuel cell for every two moles of hydrogen consumed, two moles of water are produced according to the reaction:

$$2H_2 + O_2 \rightarrow 2H_2O \qquad (2)$$

Reaction (1) and (2) exactly balance hydrogen production and water consumption. This circumstance also provides a means for fuel cell product water removal in a closed system. The overall effective reaction is, $$CaH_2 + O_2 \rightarrow Ca(OH)_2 \qquad (3)$$

an extremely high energy density system for sensor power applications.

The oxygen is provided by the catalytic decomposition of hydrogen peroxide as shown, $$H_2O_2 \rightarrow \tfrac{1}{2} O_2 + H_2O \qquad (4)$$

Reaction (4) supplies the oxygen for reactions (2) or (3).

The water produced by reaction (2) can be delivered to the calcium hydride by diffusion through the hydrogen to sustain reaction (1).

Thus, by this invention, two difficult problems are solved. First, hydrogen is stored compactly and with minimum weight. Secondly, a means is found for removing water produced by the fuel cell in a gainful way thereby solving its disposal problem and permitting a closed cycle to be built.

The fuel cell used in this invention can conveniently be an alkaline electrolyte matrix fuel cell. In such a fuel cell, for example, six single cell elements can be connected in series in two, three cell units to produce a 6V DC power source.

Hydrogen peroxide solution for example, can be stored in one central tank within the fuel cell for supplying oxygen from a single catalytic Kipp generator via a manifold to the two banks of three cells each. Calcium hydride for example, can be stored in six separate compartments as a loose powder. Peroxide is decomposed on demand by means of the catalytic Kipp generator which automatically contacts peroxide and the catalyst as the pressure in the oxygen compartment drops.

The calcium hydride can be prevented from contacting the anode directly by suitable means such as a porous polytetrafluoroethylene film. This film allows water vapor and hydrogen to pass but prevents liquids or solids from passing across it. The water vapor made by the fuel cell diffuses from the anode where it is formed, to the calcium hydride. The hydrogen formed by reaction (1) diffuses to the anode.

To facilitate a gas-tight fuel cell construction, a cellophane film can be cemented to a polysulfone frame in the electrolyte compartment. Two potassium titanate films can be located on each side of the cellophane and increase electrolyte inventory and help maintain the proper electrolyte content of the cell.

Such a fuel cell is designed to operate at low current densities of about 1 to 3mA/sq. cm and high voltage, about IV per cell. This represents a very high thermodynamic efficiency — approximately 70%.

The power output from the fuel cell of about 17mA at 6VDC can be converted into 32VDC and 2.7mA by a suitable DC to DC power processor. The output from the processor can then be placed across 23 series connected 50mA-hr nickel-cadmium batteries. This unit is now capable of sustaining 12 watt 60msec pulses.

Total systems can be operated up to 300 hours thus demonstrating the operability of this system.

BRIEF DESCRIPTION OF THE DRAWING AND THE PREFERRED EMBODIMENT

FIG. 1 is a block drawing of the hybrid fuel cell secondary battery system of the invention.

FIG. 2 is a schematic view of a complete battery/fuel cell system according to the invention.

Referring to FIG. 1 and FIG. 2, the fuel cell 10, is comprised of the fuel chambers 12 containing calcium hydride, the fuel cell electrodes 14, the oxidant chamber 16 containing liquid hydrogen peroxide and the oxidant manifold 24.

The fuel cell 10, delivers approximately 5.7 to 6.0 volts at an opening load of 17mA. The output of the fuel cell 10, is fed into the power processor 20. The output from the power processor 20, is approximately 32VDC and 2.7mA for an overall power processor efficiency between 85 and 90 percent. The power processor 20, is a completely sealed unit designed to fit into the oxidant chamber 16. The output from the power processor 20, is connected across 23 series connected 50mA hour nickel-cadmium batteries 22. The nickel-cadmium batteries 22, are placed in two stacks of 11 and 12 batteries each located at the sides of the oxidant chamber 16. The 23 cells have a fully charged potential of about 32 volts. When a continuous load of 2mA is drawn from the system, this voltage remains unchanged. To deliver the high 60msec 430mA pulse, the battery voltage drops to about 26 to 27VDC.

Although the preferred embodiment used liquid hydrogen peroxide as the oxidant source for the fuel cell, other oxidant sources might be used. These comprise the solid form of alkali metal oxygen compounds including all peroxides, sodium or potassium superoxides and potassium ozonide.

The use of calcium hydride as the fuel source for the fuel cell is preferred. Other fuel sources that may be used include solid hydrides such as lithium hydride, sodium hydride, potassium hydride, lithium aluminum hydride, sodium aluminum hydride, lithium borohydride, and sodium borohydride.

We wish it to be understood that we do not desire to be limited to the exact details of construction shown and described, for obvious modifications will occur to a person skilled in the art.

What is claimed is:

1. A hybrid fuel cell secondary battery system comprising in combination, a fuel cell, a fully contained fuel and oxidant source for said fuel cell, a DC to DC power processor for boosting the voltage output from said fuel cell, and a secondary battery in parallel with the output from the DC to DC processor to sustain peak power drains of 12 watt 60m sec. pulses.

2. A hybrid fuel cell secondary battery system according to claim 1 wherein the fuel cell is a hydrogen-oxygen fuel cell.

3. A hybrid fuel cell secondary battery system according to claim 1 wherein the fully contained fuel source is a solid hydride selected from the group consisting of lithium hydride, sodium hydride, potassium hydride, calcium hydride, lithium aluminum hydride, sodium aluminum hydride, lithium borohydride, and sodium borohydride.

4. A hybrid fuel cell secondary battery system according to claim 2 wherein the fully contained fuel source is a solid hydride selected from the group consisting of lithium hydride, sodium hydride, potassium hydride, calcium hydride, lithium aluminum hydride, sodium aluminum hydride, lithium borohydride, and sodium borohydride.

5. A hybrid fuel cell secondary battery system according to claim 4 wherein the fully contained fuel source is calcium hydride.

6. A hybrid fuel cell secondary battery system according to claim 1 wherein the fully contained oxidant source is selected from the group consisting of liquid hydrogen peroxide and the solid form of alkali metal oxygen compounds.

7. A hybrid fuel cell secondary battery system according to claim 2 wherein the fully contained oxidant source is selected from the group consisting of liquid hydrogen peroxide and the solid form of the alkali metal oxygen compounds.

8. A hybrid fuel cell secondary battery system according to claim 7 wherein the fully contained oxidant source is liquid hydrogen peroxide.

9. A hybrid fuel cell secondary battery system according to claim 1 wherein the fuel cell is a hydrogen-oxygen fuel, wherein the fully contained fuel source is calcium hydride and the fully contained oxidant source is liquid hydrogen peroxide, and wherein the secondary battery is a nickel-cadmium battery.

* * * * *